(12) United States Patent
Chen et al.

(10) Patent No.: US 7,979,500 B2
(45) Date of Patent: Jul. 12, 2011

(54) EMAIL COMPOSITION AND PROCESSING

(75) Inventors: Li Chen, Cary, NC (US); John R. Hind, Raleigh, NC (US); Yongcheng Li, Cary, NC (US); Lun Xiao, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/622,013

(22) Filed: Nov. 19, 2009

(65) Prior Publication Data
US 2011/0119338 A1    May 19, 2011

(51) Int. Cl.
*G06F 15/16* (2006.01)
(52) U.S. Cl. ...................................... 709/206
(58) Field of Classification Search .................. 709/206, 709/223
See application file for complete search history.

(56) References Cited

U.S. PATENT DOCUMENTS

| | | | |
|---|---|---|---|
| 6,118,856 A | 9/2000 | Paarsmarkt et al. | |
| 6,192,396 B1* | 2/2001 | Kohler | 709/206 |
| 6,327,612 B1* | 12/2001 | Watanabe | 709/206 |
| 6,330,589 B1* | 12/2001 | Kennedy | 709/206 |
| 6,563,913 B1 | 5/2003 | Kaghazian | |
| 6,769,067 B1 | 7/2004 | Soong | |
| 6,772,196 B1 | 8/2004 | Kirsch et al. | |
| 6,789,107 B1* | 9/2004 | Bates et al. | 709/206 |
| 7,003,724 B2* | 2/2006 | Newman | 715/273 |
| 7,187,947 B1 | 3/2007 | White et al. | |
| 7,370,277 B1* | 5/2008 | Canfield et al. | 715/752 |
| 7,454,471 B2* | 11/2008 | Sorge et al. | 709/206 |
| 7,692,653 B1* | 4/2010 | Petro et al. | 345/440 |
| 7,707,254 B2* | 4/2010 | Daniell et al. | 709/206 |
| 7,743,105 B2* | 6/2010 | Bauchot et al. | 709/206 |
| 7,770,121 B2* | 8/2010 | Jain et al. | 715/744 |
| 7,818,684 B1* | 10/2010 | Smith | 715/794 |
| 7,822,820 B2* | 10/2010 | LeVasseur et al. | 709/206 |
| 7,831,258 B2* | 11/2010 | Coskun et al. | 455/412.1 |
| 7,844,676 B2* | 11/2010 | Prahlad et al. | 709/206 |
| 2003/0212745 A1 | 11/2003 | Caughey | |
| 2005/0108335 A1 | 5/2005 | Naick et al. | |

* cited by examiner

*Primary Examiner* — Hussein A Elchanti
(74) *Attorney, Agent, or Firm* — A. Bruce Clay

(57) ABSTRACT

A computer implemented user interface allows composition of an electronic mail message. A user selects at least one pre-existing email from an email inbox. An envelope is then created by parsing each of the selected pre-existing emails. The pre-existing email is displayed as a tree structure comprising an envelope with at least a label sub-node in a new email view. A new email is composed by selecting parts from the tree structure. The sub-nodes may further comprise a content sub-node. The content sub-node further comprises multi-media parts, and the new email body is composed by selecting parts from the content sub-node.

9 Claims, 7 Drawing Sheets

EMAIL COMPOSITION AND PROCESSING

BACKGROUND

The present invention relates in general to electronic mail systems, and more specifically, to electronic mail composition techniques to create compound messages containing parts of other messages.

Electronic mail (email) is a primary communication medium for business and daily life. Chains of multiple email messages can be received on the same topic. If the receiver needs to consult someone else on the topic, he/she must open all the email chains and manually copy/paste the key messages and/or parts of them into a new email. Key messages may contain attachments (perhaps problem logs, spreadsheets, or business documents), and to forward them one must first save them to local storage and then manually re-attach them to the new mail while trying to maintain the appropriate context, given that different versions of the same filenames may be involved.

BRIEF SUMMARY

A method for composing an email message comprises selecting at least one pre-existing email from an inbox. The at least one pre-existing email is parsed to create an envelope node and at least a label sub-node thereof. The envelope node and the at least a label sub-node thereof are displayed in a new email view as a tree structure. A new email is composed by selecting parts from the tree structure.

A system for composing an email message comprises a parser for parsing at least one pre-existing email selected from an email inbox to create an envelope node and at least a label sub-node thereof. A processor is programmed to display the envelope node and the at least a sub-node thereof as a tree structure in a new email view, wherein a new email is composed by selecting parts from the tree structure.

A computer program product for composing an email message comprises a computer readable storage medium having computer readable program code embodied therewith, the computer readable program code is configured to select at least one pre-existing email from an inbox. Computer readable program code is configured to parse the at least one pre-existing email to create an envelope node and at least a label sub-node thereof. Computer readable program code is configured to display the envelope node and the at least a label sub-node thereof in a new email view as a tree structure. Computer readable program code is configured to compose a new email by selecting parts from the tree structure.

DETAILED DESCRIPTION

Figure 1:
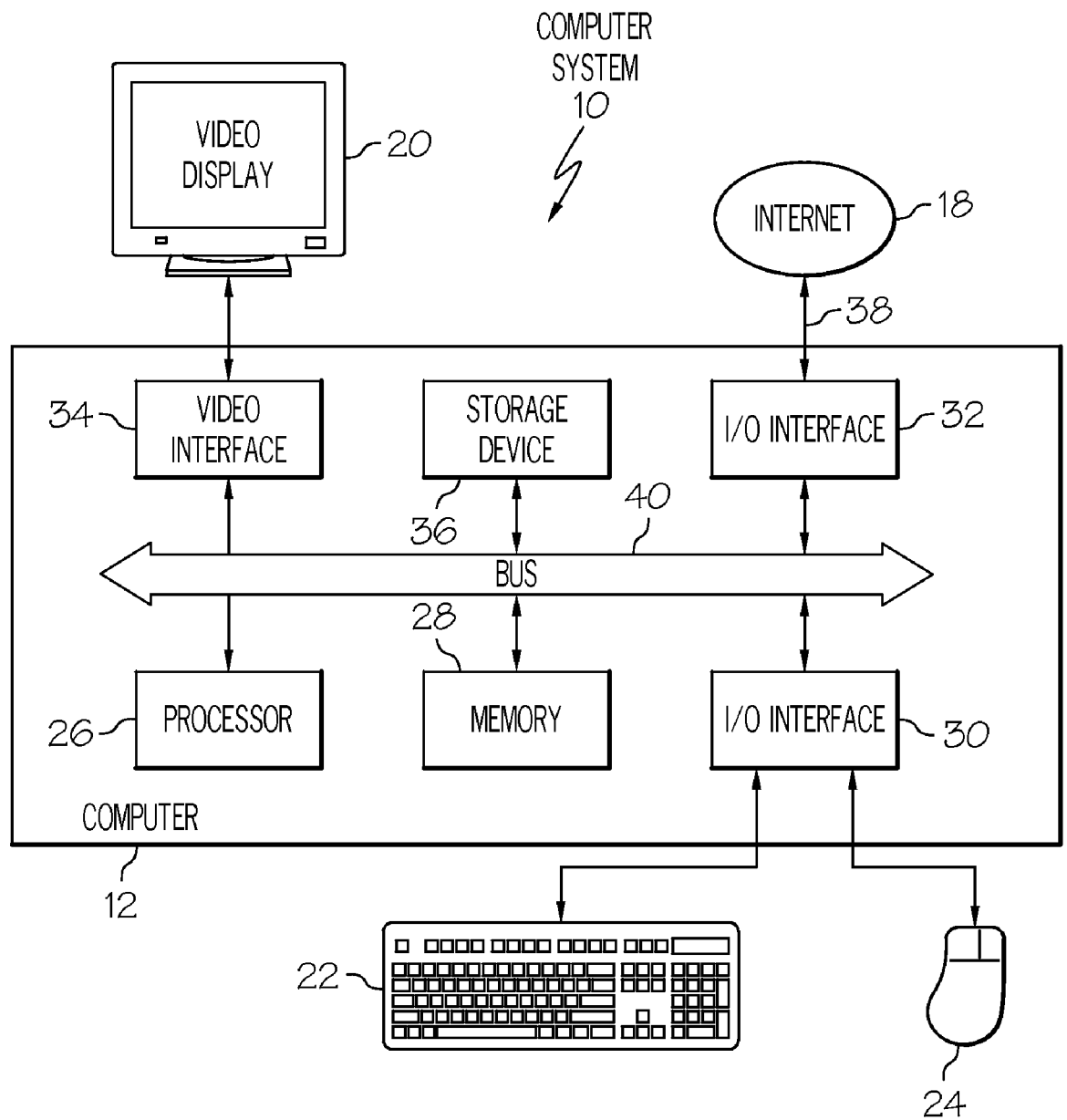
FIG. 1 illustrates a computer system upon which the present invention may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer programs products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is an example of a processing device suitable for executing computer software for composing and processing email in accordance with the techniques described above. Other processing devices which are suitable for executing the software can be a wireless telephone, personal assistant device (PDA), portable computer, smart remote control device, or any other processing devices that can execute such software. The processing device as shown in FIG. 1 is a computer system 10 of a type that executes under a suitable operating system installed on the computer system 10, and may be thought of as comprising various software code for achieving the particular steps of the embodiments of the invention.

The components of the computer system 10 include a computer 12, a keyboard 22, a mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to video display 20 and provides video signals for display on the video display 20. User input to operate the computer 12 is provided from the keyboard 22 and mouse 24. The storage device 36 can include a disk drive or any other suitable storage medium. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18.

The computer software may be recorded on a computer readable storage medium, in which the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

An embodiment of the present invention is used to create a set of rules for exposing and using Multipurpose Internet Mail Extensions (MIME) headers to facilitate composition of a rich content message (multimedia content such as audio, video, still image, animation, and text) from reference rich content email. The concept of an envelope with external labels, such as, to/from addresses, handling instructions, and delivery history and which may contain a rich message (which may, itself, contain even more envelopes), is used. A user interface allows the user to compose a new email message which uses the envelope labels and contains content elements of a set of reference emails in the composition process.

As an envelope may contain more envelopes which, in turn, may contain envelopes, this arrangement may be viewed as a tree of nodes with the top node being an envelope. Each envelope node has at least one label sub-node and optional content sub-nodes. Each label sub-node has one or more header nodes (e.g. from, to, subject, and etc.). A content node has one or more parts which can be an envelope, an attachment, rich text, image, or script.

Envelope labels are represented by RFC 822 (Standard for the Format of ARPA Internet Text Messages) compatible email message headers, and the envelope content is encoded using MIME conventions (RFC 2045, RFC 2046, RFC 2047, RFC 4288, RFC 4289 and RFC 2077). Thus, an "envelope" has the format of rich content email, and may be routed by the existing email infrastructure between a sender and recipient. Furthermore, a single envelope with a rich message can be created and understood by most email clients.

Figure 2:
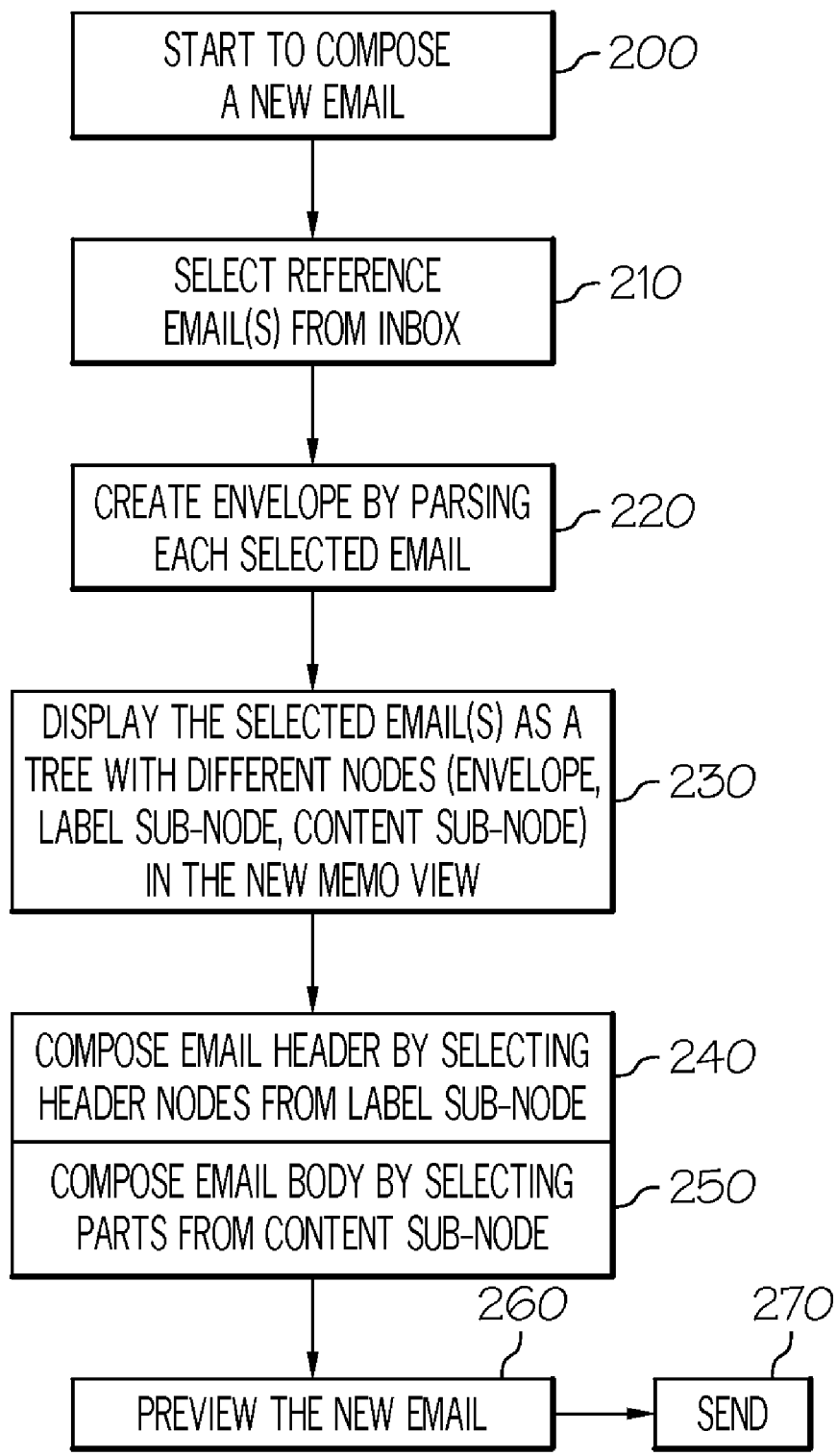
FIG. 2 is a flowchart describing an embodiment of the present invention.
Figure 3:
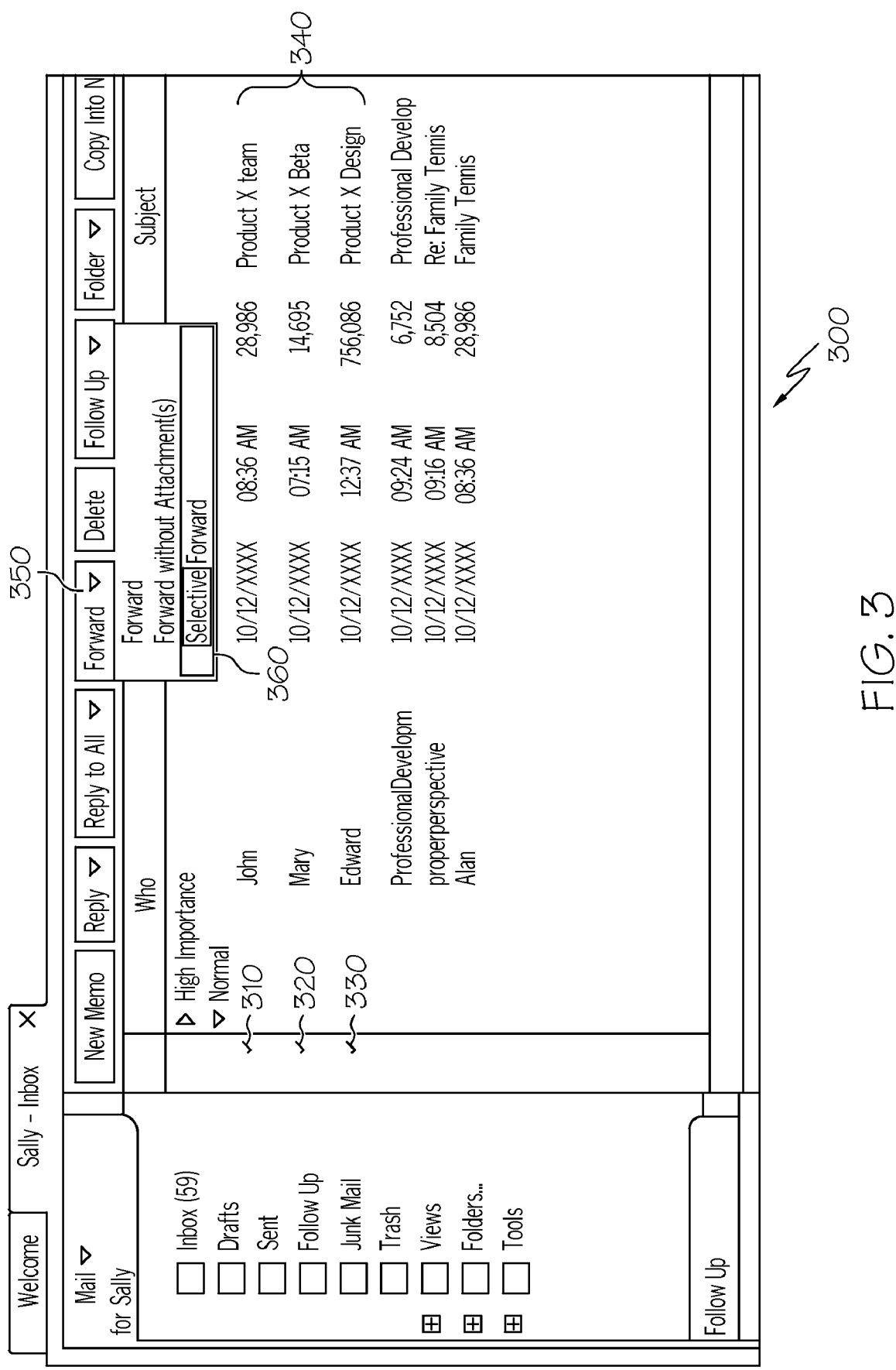
FIG. 3 illustrates an inbox for a typical email system.

An embodiment of the present invention will now be described with reference to FIGS. 2-6. Referring first to FIG. 2, a flow chart illustrates the steps of one embodiment of the present invention. At block 200, the invention starts with a user composing a new email. At box 210, the user selects reference email(s) from his/her inbox. Referring to FIG. 3, a typical user inbox 300 is shown with a plurality of email items previously received by the user. As shown in FIG. 3, the user has selected three email items (as indicated by check marks 310, 320 and 330). Although not necessary for implementing the invention, it can be seen by the subject information 340 that each email selected is related to the same subject (Product X). The user then clicks on the command "Forward" 350 and then selects "Selective Forward" 360.

Figure 4:
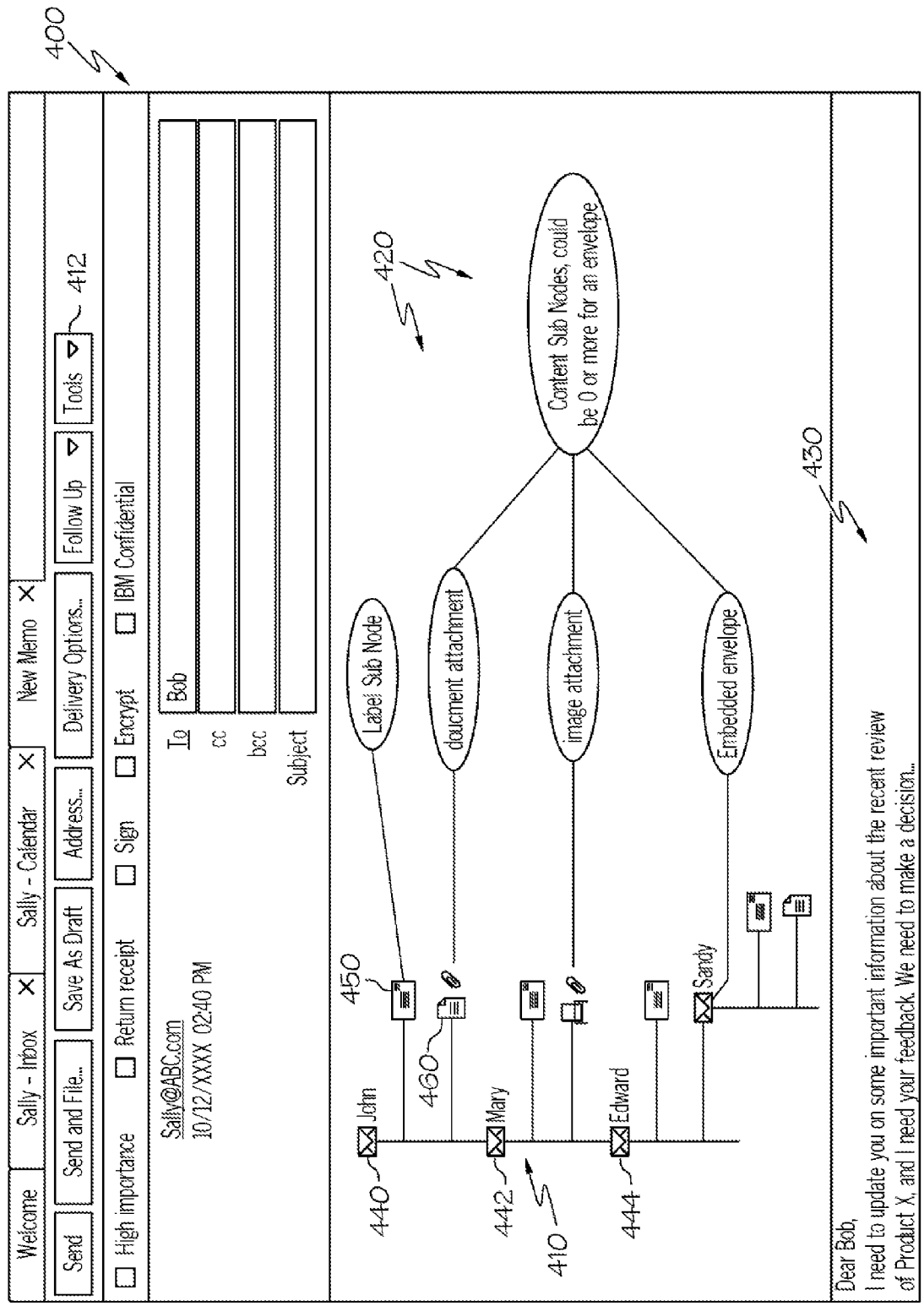
FIG. 4 illustrates a New Memo view of an email system which embodies the present invention.

Next at block 220 of FIG. 2, an envelope is created by parsing each of the selected email(s). At block 230, and as shown in FIG. 4, the selected email (indicated by check marks 310, 320, and 330 in FIG. 3) is displayed in a New Memo view 400 as a tree 410. There are two sections in the New Memo view 400, a Top Section 420 and a Bottom Section 430.

The Top Section 420 may be presented as a separate (pop-up) window by selecting, for example, a tool from a Tool menu 412, or as shown in FIG. 4. The Top Section 420 contains a tree 410 built by parsing the selected email indicated by check marks 310, 320, and 330 in FIG. 3. The top section 420 is expandable and collapsible as needed and includes different nodes, for example, Envelope 440, Label sub-node 450, and Content sub-node 460. The Envelope 440 represents the selected email indicated by check mark 310 in FIG. 3 from John. Similarly, the Envelope 442 and the Envelope 444 represent the selected email indicated by the check marks 320 and 330, respectively, in FIG. 3.

The Label sub-node 450 represents the names in the "To," "From," "Bcc," and "cc" headers of the selected email. A Content sub-node, if any, may comprise an attached document file, image file, video file, or audio file. In addition, a Content sub-node may include another embedded envelope with its own included Label sub-node and Content sub-nodes. The user can "hover" a mouse pointer over each node in the tree 410 to see the detailed information and select the nodes from the tree for inclusion in the new memo. The Bottom Section 430 is where the user would enter whatever information is needed to explain the email and/or what the user wants.

Figure 5:
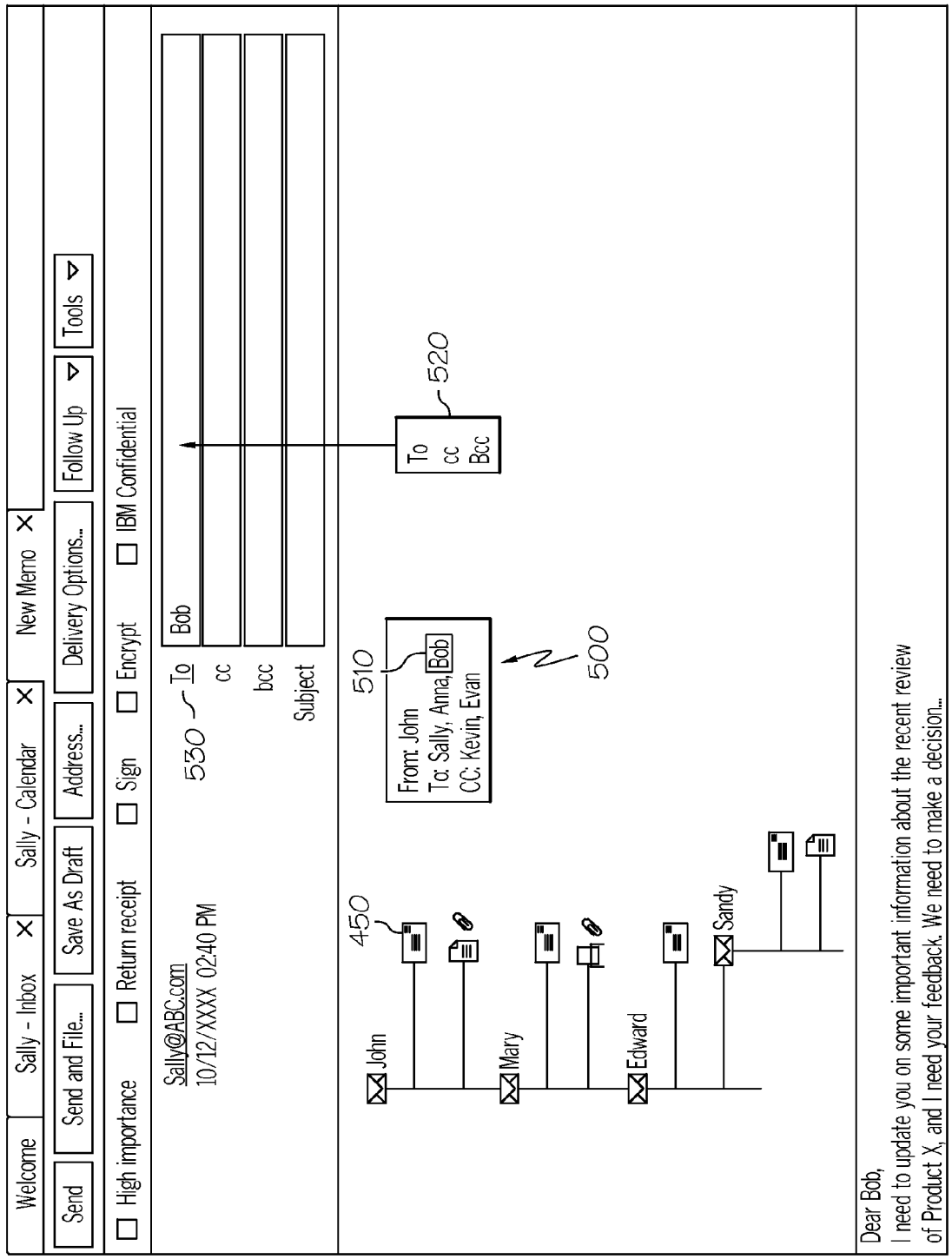
FIG. 5 illustrates a pop-up box feature of the present invention.

Referring again to FIG. 2, the user composes the email header at block 240 by selecting header nodes from the various Label sub-nodes (i.e., "To," "From," "Bcc," and "cc"). In FIG. 5, for example, the user may "hover" over the Label sub-node 450 to see the contents 500. As shown, Bob 510 has been selected by high-lighting. A pop-up 520 will then appear allowing for selection of "To," "cc," or "Bcc," as the user chooses. In FIG. 5, the user has selected "To" in the pop-up 520 and the name Bob 510 is added to the "To" line 530 of the new email.

Figure 6:
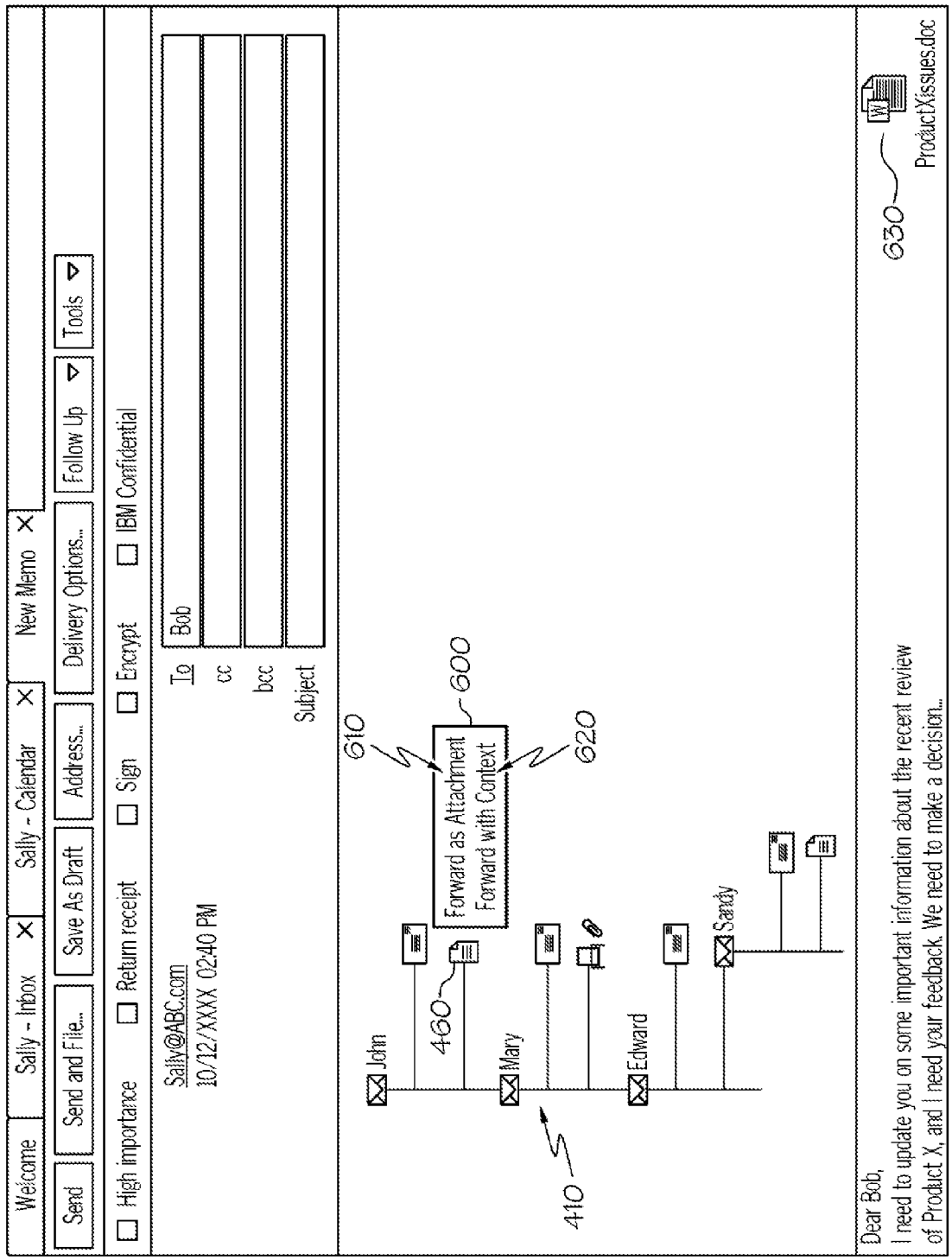
FIG. 6 illustrates a context menu feature of the present invention.

Returning once again to the flow chart of FIG. 2, the user now composes what will appear in the email body by selecting parts from the various Content sub-nodes. For example, in FIG. 6, the user selects the Content sub-node 460 (in this example a document with a file name Product X issues.doc which would be identified to the user by hovering over the Content sub-node 460) from the tree 410, right clicks to see the context menu 600, and selects Forward as Attachment 610 or Forward with Context 620. Forward with Context would cause the content to be forwarded with the chain of containing envelope headers, whereas, Forward as Attachment will simply attach the content to the bottom section of the new composed email. FIG. 6 shows the user selected Forward as Attachment 610 from the context menu 600. The document attachment, Product X issues.doc in John Doe's email will be attached in the new composed email as indicated by reference numeral 630. The user then previews the new email at block 260 of FIG. 2, and if satisfied, sends the email at block 270. The received email will display the information placed in the bottom section of the email.

Figure 7:
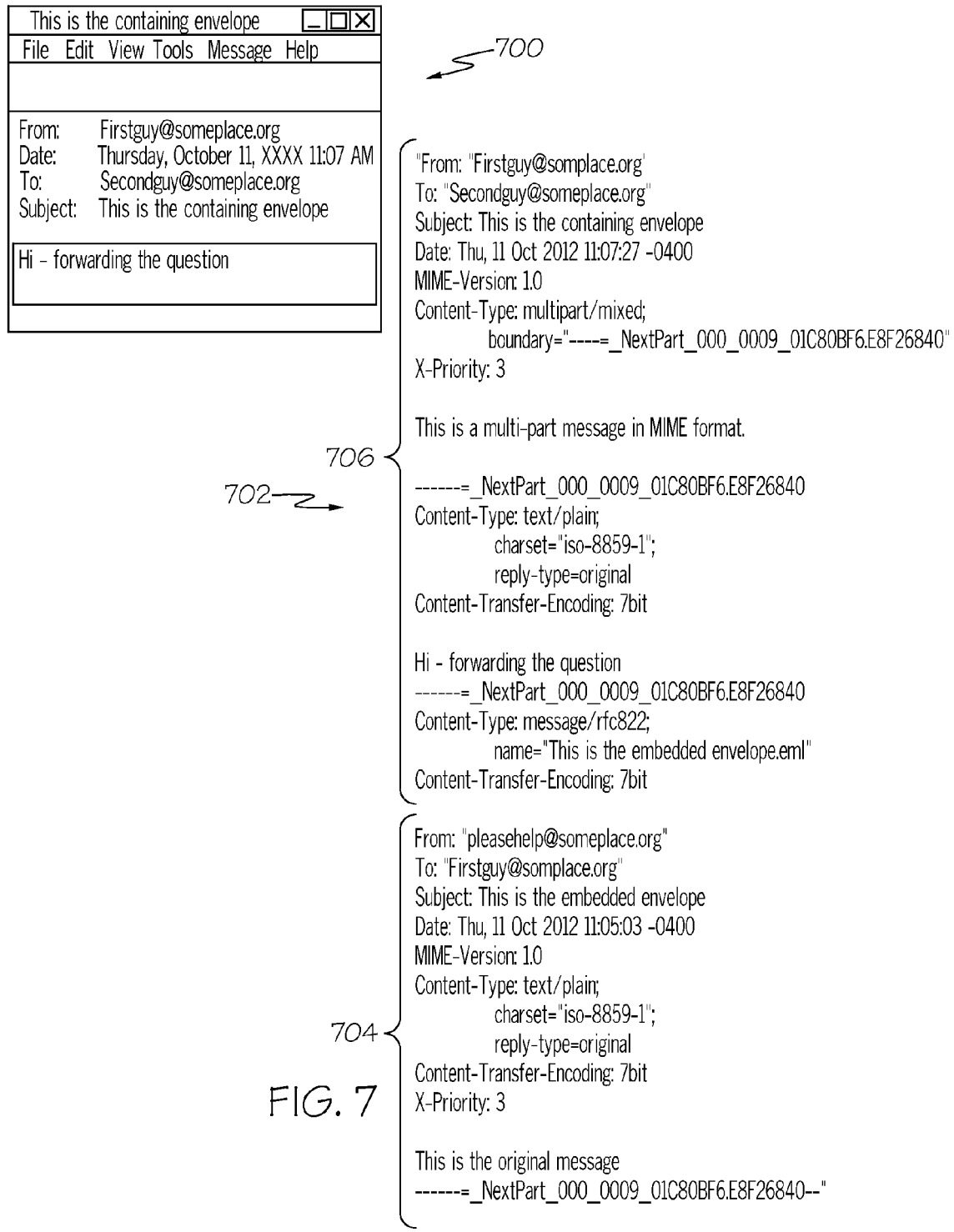
FIG. 7 illustrates use of the present invention with an unmodified email system.

Referring now to FIG. 7, an example is shown of the present invention in use with an existing email system. The user can compose a new email 700 by visually accessing and manipulating a tree 702 of envelope nodes created by parsing selected emails. FIG. 7 is a representation of a case of one envelope 704 enclosed in another envelope 706 using encodings that would be understood by, for example, a Microsoft® Windows® Outlook Express (Microsoft and Windows are trademarks of Microsoft Corp. in the United States, other countries or both) email client. FIG. 7 displays how the message encoding (following RFC standards) would be seen in the email client without modifying the email system with the present invention. This interoperability allows the current email system to adopt the present invention without introducing any new standards.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer implemented method for composing an email message, comprising:
   presenting, using a processor, a new email view;
   parsing, using said processor, at least a first and a second email selected from a set of unchained emails in an inbox in order to create a first envelope node for said first email and a second envelope node for said second email, each said first and second envelope node comprising a label sub-node, said label sub-node comprising addressees in To, From, BCC, and CC headers of said first and said second email, respectively, and a content sub-node, said content sub-node comprising content and any file attached to said first and said second email, respectively;
   displaying, as a tree structure, said first and said second envelope node, said label sub-node, and said content sub-node, respectively, in said new email view; and
   constructing said new email from selected parts of said tree structure by selecting desired addressees to receive said new email from said label sub-node and by selecting content from said content sub-node.

2. The method of claim 1, wherein said content sub-node further comprises multi-media parts.

3. The method of claim 1, wherein said envelope node further comprises another envelope as a sub-node thereto.

4. A system for composing an email message, comprising:
   a processor; and
   memory connected to the processor, wherein the memory is encoded with instructions and wherein the instructions, when executed, comprise:
   instructions for presenting a new email view;

instructions for parsing at least a first and a second email selected from a set of unchained emails in an inbox in order to create a first envelope node for said first email and a second envelope node for said second email, each said first and second envelope node comprising a label sub-node, said label sub-node comprising addressees in To, From, BCC, and CC headers of said first and said second email, respectively, and a content sub-node, said content sub-node comprising content and any file attached to said first and said second email, respectively;

for each of said selected emails, instructions for displaying, as a tree structure, said envelope node, said label sub-node, and said content sub-node in said new email view;

instructions for displaying, as a tree structure, said first and said second envelope node, with said label sub-node, and said content sub-node, respectively, in said new email view; and instructions for constructing said new email from selected parts of said tree structure by selecting desired addressees to receive said new email from said label sub-node and by selecting content from said content sub-node.

5. The system of claim 4, wherein said content sub-node further comprises selectable multi-media parts.

6. The system of claim 4, wherein said envelope node further comprises another envelope as a sub-node thereto.

7. A computer program product for composing an email message, the computer program product comprising:

a non-transitory computer readable storage medium having computer readable program code embodied therewith, the computer readable program code comprising:

computer readable program code configured to present a new email view;

computer readable program code configured to parse at least a first and a second email selected from a set of unchained emails in an inbox in order to create a first envelope node for said first email and a second envelope node for said second email, each said first and second envelope node comprising a label sub-node, said label sub-node comprising addressees in To, From, BCC, and CC headers of said first and said second email, respectively, and a content sub-node, said content sub-node comprising content and any file attached to said first and said second email, respectively;

computer readable program code configured to display, as a tree structure, said first and said second envelope node, said label sub-node, and said content sub-node, respectively, in said new email view; and computer readable program code configured to construct said new email from selected parts of said tree structure by selecting desired addressees to receive said new email from said label sub-node and by selecting content from said content sub-node.

8. The computer program product for composing an email message of claim 7, wherein said content sub-node further comprises multi-media parts.

9. The computer program product for composing an email message of claim 7, wherein said envelope node further comprises another envelope as a sub-node thereto.

* * * * *